US008332647B2

(12) United States Patent
Bradley, II et al.

(10) Patent No.: US 8,332,647 B2
(45) Date of Patent: Dec. 11, 2012

(54) SYSTEM AND METHOD FOR DYNAMIC MULTI-ATTRIBUTE AUTHENTICATION

(75) Inventors: Charles B. Bradley, II, Largo, FL (US); Thomas Farley, Wimauma, FL (US); Ricardo J. Rodriguez, Palmetto, FL (US)

(73) Assignee: Raytheon Company, Waltham, MA (US)

( * ) Notice: Subject to any disclaimer, the term of this patent is extended or adjusted under 35 U.S.C. 154(b) by 654 days.

(21) Appl. No.: 12/491,558

(22) Filed: Jun. 25, 2009

(65) Prior Publication Data

US 2010/0332825 A1 Dec. 30, 2010

(51) Int. Cl.
*H04L 9/32* (2006.01)
(52) U.S. Cl. .................... 713/176; 713/186; 726/10
(58) Field of Classification Search .............. 713/176, 713/186; 726/10
See application file for complete search history.

(56) References Cited

U.S. PATENT DOCUMENTS

| 5,537,475 | A | 7/1996 | Micali ........................ 380/30 |
| 5,557,678 | A | 9/1996 | Ganesan ..................... 380/21 |
| 5,590,199 | A | 12/1996 | Krajewski, Jr. .............. 380/25 |
| 7,099,620 | B2 | 8/2006 | Miller ........................ 434/350 |
| 7,185,364 | B2* | 2/2007 | Knouse et al. ............... 726/8 |
| 2003/0046539 | A1 | 3/2003 | Negawa ..................... 713/163 |
| 2006/0068757 | A1* | 3/2006 | Thirunarayanan et al. ... 455/411 |
| 2009/0106548 | A1 | 4/2009 | Arditti et al. |
| 2010/0070761 | A1* | 3/2010 | Gustave et al. ............. 713/156 |

OTHER PUBLICATIONS

Intellectual Property Office, "Patents Act 1977: Search Report Under Section 17(5)," Oct. 13, 2010, 3 pages.
Walter et al., "Security and Trust Issues in Ubiquitous Environments—The Business-to-Employee Dimension," Proceedings of the 2004 International Symposium on Applications and the Internet Workshops, IEEE, 2004.
Bishop, Matt; "Computer Security: Art and Science;" Chapter 12: Authentication; Addison Wesley; pp. 309-335, 2003.

* cited by examiner

*Primary Examiner* — Christopher Brown
(74) *Attorney, Agent, or Firm* — Schwegman Lundberg & Woessner, P.A.

(57) ABSTRACT

In accordance with the teachings of the present invention, a system and method for dynamic, multi-attribute authentication are provided. In a particular embodiment, a method for authentication includes receiving, at an authentication web server, an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The method further includes verifying the workstation signature and user signature, validating the workstation certificate and the user certificate, retrieving one or more caveats associated with the workstation and one or more caveats associated with the user, and determining one or more caveats associated with both the workstation and the user.

20 Claims, 3 Drawing Sheets

SYSTEM AND METHOD FOR DYNAMIC MULTI-ATTRIBUTE AUTHENTICATION

TECHNICAL FIELD OF THE INVENTION

The present disclosure generally relates to user and workstation authentication in a computing environment and, more particularly, to a system and method for dynamic, multi-attribute authentication.

BACKGROUND OF THE INVENTION

In communication networks, authentication schemes are often used to verify the identity of a user or device attempting to access network resources. In order to authenticate a user or device, some communication networks require users and/or devices to submit a username, password, digital certificate, and/or biometric information to access network resources. Generally, the more information required for authentication, the "stronger" the authentication scheme may be said to be. However, even in networks with multi-factor authentication schemes, it may be possible to exploit weaknesses in the authentication scheme to gain unauthorized access to the network. As the importance of communications networks grows, so too does the need to guard against such security breaches.

SUMMARY OF THE INVENTION

In accordance with the teachings of the present invention, a system and method for dynamic, multi-attribute authentication are provided. In a particular embodiment, a system for authentication comprises an authentication web server operable to receive an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The system further comprises a certificate validation module is operable to validate the workstation certificate and the user certificate, and an attribute retrieval module operable to retrieve one or more caveats associated the workstation and one or more caveats associated with the user and determine one or more caveats associated with both the workstation and the user. In particular embodiments, the authentication web server may be further operable to verify the workstation signature and the user signature.

In another embodiment, a method for authentication includes receiving, at an authentication web server, an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The method also includes verifying the workstation signature and user signature, validating the workstation certificate and the user certificate, retrieving one or more caveats associated with the workstation and one or more caveats associated with the user, and determining one or more caveats associated with both the workstation and the user.

In yet another embodiment, a system for authentication comprises logic encoded in computer-readable media and operable, when executed by one or more processors, to receive an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The logic is further operable to verify the workstation signature and user signature, validate the workstation certificate and the user certificate, retrieve one or more caveats associated with the workstation and one or more caveats associated with the user, and determine one or more caveats associated with both the workstation and the user.

A technical advantage of particular embodiments of the invention may include the ability to verify both the user and the workstation from which the user is connecting. Moreover, by including a copy of the workstation message in the user object, particular embodiments of the present invention may make the authentication of the user dependent on the authentication of the workstation, helping to reduce workstation signature substitution and/or workstation spoofing.

Another technical advantage of particular embodiments of the invention may include the ability to extend the authentication process to include additional attributes of the workstation, such as the workstation name and domain name, in the workstation object, and additional attributes of the user, such as the user name and biometric data, in the user object. By including these additional attributes, particular embodiments of the present invention may be able to provide even greater granular control over access to secure data and/or applications.

It will be understood that the various embodiments of the present invention may include some, all, or none of the enumerated technical advantages. In addition other technical advantages of the present invention may be readily apparent to one skilled in the art from the figures, description, and claims included herein.

BRIEF DESCRIPTION OF THE DRAWINGS

For a more complete understanding of the present invention and features and advantages thereof, reference is now made to the following description, taken in conjunction with the accompanying drawings, in which.

DETAILED DESCRIPTION OF THE INVENTION

In accordance with the teachings of the present invention, a system and method for dynamic, multi-attribute authentication are provided. In a particular embodiment, a method for authentication comprises receiving, at an authentication web server, an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The method further comprises verifying the workstation signature and user signature, validating the workstation certificate and the user certificate, retrieving one or more caveats associated with the workstation and one or more caveats associated with the user, and determining one or more caveats associated with both the workstation and the user. In particular embodiments, the workstation object may further comprise a machine name, a domain name, a time stamp, and/or a globally unique identifier. Similarly, the user object may further comprise a user name, biometric data associated with the user, an application name, the machine name, the domain name, the time stamp, and/or the globally unique identifier.

By including a copy of the workstation message in the user object, particular embodiments of the present invention may be able to bind the authentication of the user to the authentication of the workstation. In such an embodiment, the workstation may be independently authenticated, but the authentication of the user depends on the authentication of the workstation. This allows the system to authenticate both the workstation and the user, and ensure that the user is accessing the application from only the approved workstation. Additionally, but allowing the workstation object to include additional attributes of the workstation, and the user object to include additional attributes of the user, particular embodiments may allow for greater granular control over access to secure network resources.

Figure 1:
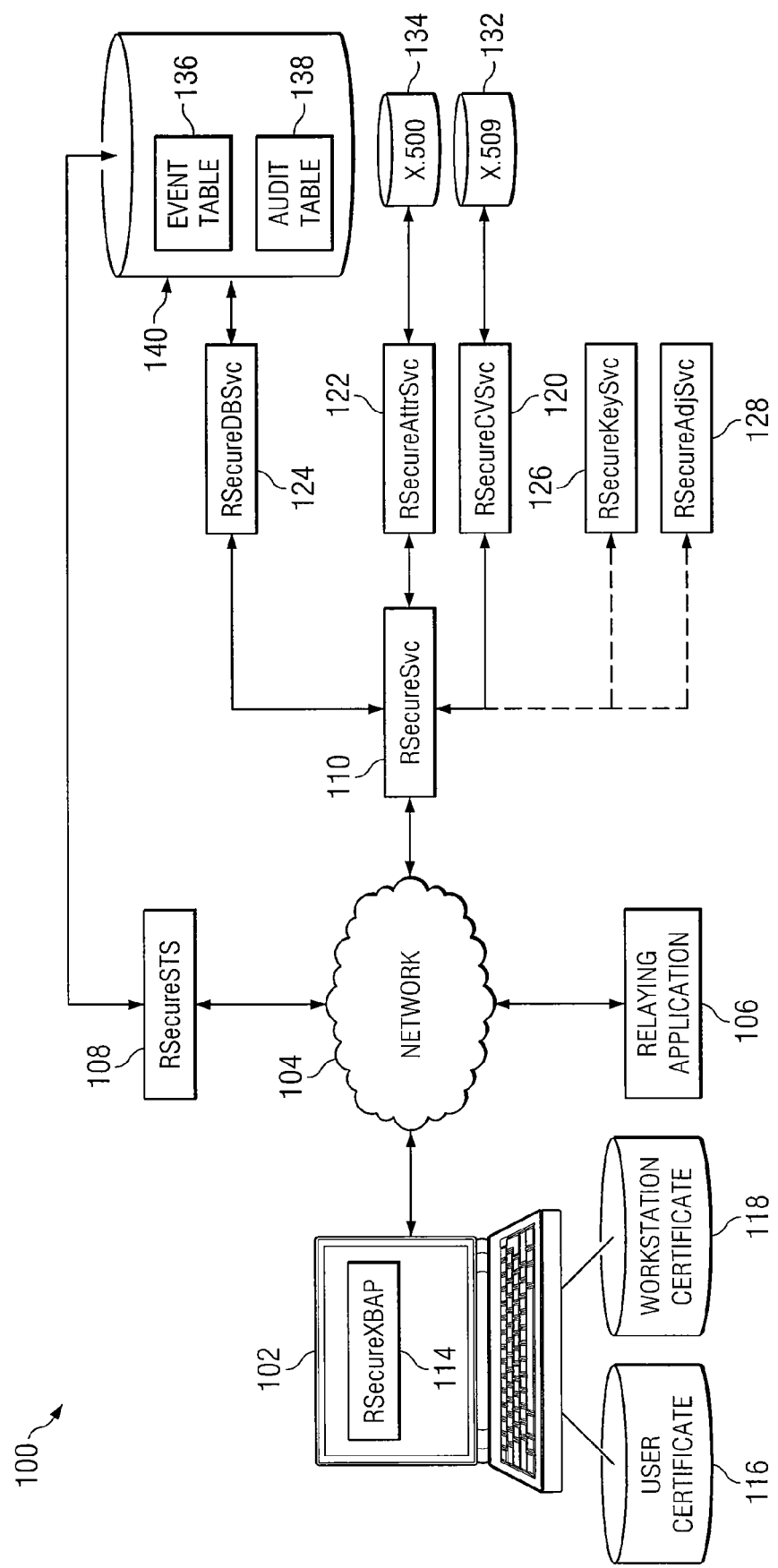
FIG. 1 illustrates a system utilizing dynamic, multi-attribute authentication in accordance with a particular embodiment of the present invention.

FIG. 1 illustrates an RSecure system 100 in accordance with a particular embodiment of the present invention. As shown in FIG. 1, system 100 generally comprises a workstation 102, a network 104, an application 106, a security token service ("RSecureSTS") 108, and a security service ("RSecureSvc") 110. Generally, the user of workstation 102 makes a request to access application 106 through network 104. In this embodiment, application 106 requires a security token from workstation 102 for workstation 102 to access the application. If workstation 102 does not present a security token to application 106, application 106 redirects workstation 102 to RSecureSTS 108, which is a security token service trusted by application 106. RSecureSTS 108 works with workstation 102 to generate a user-to-workstation authentication request which is sent to RSecureSvc 100. RSecureSvc 110 then processes the user-to-workstation authentication request using a number of service-oriented support services. Once authenticated by RSecureSvc 110, workstation 102 may be issued a security token by RSecureSTS 108 to allow workstation 102 to access application 106.

As mentioned above, system 100 generally comprises workstation 102, network 104, application 106, RSecureSTS 108, and RSecureSvc 110. Generally, workstation 102 may comprise any suitable network device, including but not limited to a personal computer ("PC"), handheld computer, personal digital assistant ("PDA"), portable gaming device, cellular telephone, or VoIP telephone.

In particular embodiments, workstation 102 and its user may be authenticated by system 100 using public key encryption. Public key encryption is an asymmetric form of encryption that utilizes two keys for each workstation and/or user: a public key and a private key. The private key is kept private by the user and/or workstation, while the complementary public key is made publicly available. For example, information may be encrypted with a user's private key and transmitted to a second user. The second user uses the first user's complementary public key to decrypt the encrypted information thereby authenticating the first user. The second user can also encrypt information with its own private key, send the encrypted information to the first user, and the first user may use the second user's public key to decrypt the encrypted information in order to authenticate the second user.

Digital certificates may be utilized to certify credentials associated with a public key. The term "digital certificate" may refer to a piece of data or information that has been "digitally signed"—signed by, for example, a certificate authority. Prior to issuing a digital certificate, a certificate authority typically (1) verifies an identity of an endpoint, and (2) verifies that the endpoint is in possession of a particular private key. A digital certificate typically includes the public key of the verified endpoint. Other information about the endpoint may also be included. The information is hashed (e.g., "digitally signed") with the certificate authority's private key. The signed digital certificate (1) serves as proof of possession of a private key, and (2) operates to bind certain information (e.g., identity) to a particular workstation or user.

One of ordinary skill in the art, however, would recognize that the present disclosure is not limited to public key encryption, and that other methods of encrypting information and/or authenticating a user and/or workstation may be used in accordance with the teachings of the present disclosure. For example, Kerberos authentication may be used in particular embodiments of the present invention in place of the public key encryption schemes discussed herein.

Nonetheless, in the embodiment illustrated in FIG. 1, in order to authenticate itself and its user, workstation 102 includes both a user certificate store 116 and a workstation certificate store 118. Generally, user certificate store 116 is operable to store a user certificate having both public and private keys, whereas workstation certificate store 118 is operable to store a workstation certificate having both public and private keys. In particular embodiments, user certificate store 116 and/or workstation certificate store 118 may be included in a portion of the memory of workstation 102. In other embodiments, user certificate store 116 and/or workstation certificate store 118 may comprise a hardware token (either connected or disconnected) associated with workstation 102 or its user.

As mentioned above, workstation 102 connects to application 106 through network 104. In particular embodiments, application 106 may be any suitable network application. For example, application 106 may comprise any suitable network application, such as a file-sharing application, an email application, a chat application, a document server application, a voice over Internet Protocol ("VoIP") application, or a whiteboarding application. Similarly, in particular embodiments, network 104 may comprise any suitable network, including but not limited to the Internet, a local area network ("LAN"), a wide area network ("WAN"), a virtual private network ("VPN"), a metropolitan area network ("MAN"), a campus area network ("CAN"), or a wireless network.

When workstation 102 attempts to connect to application 106, application 106 requests a security token from workstation 102. If workstation 102 does not present a security token to application 106, application 106 redirects workstation to RSecureSTS 108, which is a security token service trusted by application 106. Generally, RSecureSTS 108 is operable to control the processing of security token requests and the building of resultant security tokens for clients, such as workstation 102.

Each time a user is redirected to the RSecureSTS 108, browser application RSecureXBAP 114 is downloaded into the user's temporary internet files, assuming that RSecureXBAP 114 is not already in the user's cache. In particular embodiments, RSecureXBAP 114 may be a Net-based "signed browser application" embedded on the RSecureSTS 108 service or webpage, and configured to run as a trusted application. As part of the configuration process, the Code Signing Certificate's Public Key is installed into what is known as the User's Trusted Publishers Store. Because of this, when RSecureXBAP 114 is downloaded via RSecureSTS 108, the digital signature for RSecureXBAP 114 is validated against the certificate in the user's Trusted Publisher Store. In particular embodiments, this allows RSecureXBAP 114 to bypass any inherent "security sandboxing" process, and gain security privileges to access the user's certificate store and obtain handles to both of the user's and workstation's public and private keys. Using these keys, along with other information about the user and the workstation, RSecureXBAP 114 may generate a user-to-workstation authentication request for access to application 106.

In addition to workstation 102 downloading RSecureXBAP 114, each time RSecureSTS 108 is loaded by workstation 102, RSecureSTS 108 generates a globally unique identifier ("GUID"), which is passed to RSecureXBAP 114 as a startup parameter in the form of a query string. RSecureXBAP 114 parses the query string and extracts the GUID from the string. The GUID may then be used in the user-to-workstation binding process as both a random number for robust digital signature creation and a unique identifier for each authentication request.

As mentioned above, RSecureXBAP 114 may generate a user-to-workstation authentication request for access to application 106. In particular embodiments, this user-to-workstation authentication request may comprise a workstation message, including a workstation object and a workstation signature, and a user message, including a user object and a user signature. In particular embodiments, RSecureXBAP 114 may generate the workstation object from data comprising the workstation certificate, a time stamp, the GUID generated by RSecureSTS 108, and/or any other suitable information associated with the workstation. Examples of such information associated with the workstation include, but are not limited to, a machine name, a domain name, an internet protocol ("IP") address, an address resolution protocol ("ARP") table, or global position system ("GPS") location information. In particular embodiments, depending on the type of device (e.g., a personal computer, a personal digital assistant), or a cellular telephone) attempting authentication, RSecureXBAP 114 may include different types of information in the workstation message. For example, a personal computer may lack GPS location information, but have access to an IP address. Conversely, a cellular phone may have GPS location information, but lack an IP address. Accordingly, in particular embodiments RSecureXBAP 114 may generate a workstation object that takes into account the different workstation information that may be available to it. This functionality allows for dynamic, multi-attribute authentication of the workstation. Once the data for the workstation object is gathered, the workstation object is serialized, for example, into Extensible Markup Language ("XML")/Simple Object Access Protocol ("SOAP") format, and signed using the private key of the workstation certificate.

Similarly, RSecrueXBAP 114 may generate the user object from data comprising the user certificate, the time stamp (which is the same as for the workstation object), the GUID (which is the same as for the workstation object), a copy of the workstation message described above, the name of the application being requested, and/or any other suitable information about the user. Examples of such information about the user include, but are not limited to, biographical and biometric data. Again, depending on the type of device attempting authentication, RSecureXBAP 114 may include different types of information in the user message. For example, particular devices may lack the ability to detect biometric information from the user, whereas others may have this ability. Accordingly, in particular embodiments, RSecureXBAP 114 may generate a user object that takes into account the different user information that may be available to it. This functionality allows for dynamic, multi-attribute authentication of the user. Once the user information is gathered, the user object is serialized, for example, into XML/SOAP format, and signed using the private key of the user certificate. The workstation message and user message are then placed into a user-to-workstation request that is sent to RSecureSvc 110 for processing.

As the above discussion demonstrates, the type and amount of information included in the authentication request may vary depending on the type of device requesting authentication. Accordingly, particular embodiments of the present invention may implement a type of risk-adaptive access control ("RAdAC") to limit the access given to a user or workstation depending on the amount and/or type of information provided in the authentication request. For example, in some embodiments, the more information about the workstation and user that is provided in the authentication request, the higher the level of access granted to the workstation and user. Similarly, in some embodiments, particular types of information may be deemed more trustworthy than others. Accordingly, those types of information may be given more weight than other types of information when determining the level of access to grant to a user and/or workstation.

In particular embodiments employing RAdAC, information other than the user certificate and workstation certificates (e.g., ARP tables, GPS information) could be used to determine additional caveats associated with the user and/or workstation. For example, a user could take a laptop computer to a foreign country and attempt to access a network application over the Internet. In this scenario, the user and laptop computer may have valid user and workstation certificates. However, the laptop computer would have an ARP table and/or GPS information indicating the computer's location in a foreign country. Based on this information, the authentication system may allow the user/workstation to access certain, less sensitive information, such as directory information, but restrict the user/workstation from accessing sensitive information, such as information covered by International Traffic in Arms Regulations ("ITAR"). With the benefit of this disclosure, one of ordinary skill in the art should be able to determine other ways in which additional information about the user and/or workstation included in the authentication request may be used to restrict the access granted to the user and/or workstation within the teachings of the present disclosure.

Although, RSecureXBAP 114 has been described above as a signed Net-based browser application, in other embodiments of the present invention, RSecureXBAP 114 may be replaced by a signed Java applet. In yet other embodiments, RSecureSTS 108 and RSecureXBAP 114 may be replaced with an active client ("RSecureClientSvc") installed on workstation 102. In such an embodiment, RSecureClientSvc (not illustrated) may be a Net-based service that provides one or more interfaces to access user, workstation, and/or user-to-workstation bindings. In such an embodiment, because RSecureClientSvc is an installed service, it may not have "security sandbox" limitations and may have complete access to user certification store 116 and workstation certification store 118. Results returned from the service may be considered authoritative and other applications need only utilize information provided by the service accordingly. In particular embodiments, RSecureClientSvc may offer the added benefit of being able to have its configuration managed using an application configuration file. Regardless of whether RSecureClientSvc or RSecureXBAP 114 is utilized to generate the user-to-workstation authentication request, once generated, the user-to-workstation authentication request is sent to RSecureSvc 110 for processing.

As shown in FIG. 1, RSecureSvc 110 may use a variety of support services to process the user-to-workstation authentication request received from workstation 102. In particular embodiments, these may include a certificate validation service ("RSecureCVSvc") 120, an attribute retrieval service ("RSecureAttrSvc") 122, and a database service ("RSecureDBSvc") 124. In particular embodiments, these services may be implemented as service-oriented support services.

Upon receipt of a user-to-workstation authentication request, RSecureSvc 110 extracts the workstation data and reformulates it into a format representative of the original structure of the workstation message. The workstation signature value is set to null and the data is re-serialized. RSecureSvc 110 extracts the workstation certificate and uses the certificate to obtain a workstation public key object. Using this workstation public key object, the workstation's signature is verified using the original workstation signature and the newly serialized workstation object.

Upon verification of the workstation, the user verification is processed by RSecureSvc 110 in a similar manner. The workstation signature is set to that of the original incoming workstation signature, and the user signature is set to null. The data is then re-serialized. RSecureSvc 110 extracts the user certificate and uses the certificate to obtain a user public key object. Using this user public key object, RSecureSvc 120 verifies the user's signature using the original user signature and the newly serialized user object.

Upon completion of both the authentication of the workstation and user, RSecureSvc 110 calls RSecureCVSvc 120 to perform certificate verification for both the workstation certificate and the user certificate. As part of this verification, RSecureCVSvc 120 accesses X.509 database 132. Upon receiving a verification request, RSecureCVSvc 120 checks the user and workstation certificates for expiration, checks the validity of the issuers against the expected issuers, and verifies that the certificates are not present on a certificate revocation list ("CRL"). In the event of a verification failure, RSecureCVSvc 120 logs the failure by calling RSecureDBSvc 124 and passing the appropriate certificate information, the reason for the failure, and the error status.

Upon successful verification of both the workstation and user certificates, RSecureSvc 110 extracts the distinguished names ("DN") from both certificates and calls RSecureAttrSvc 122 to obtain the intersection of their caveats. Generally, RSecureAttrSvc 122 may comprise any suitable attribute retrieval service. In particular embodiments, RSecureAttrSvc 122 may act as an interface layer above the directory services of directory 134, which may comprise a Microsoft Active Directory or X.500 directory. Generally, directory 134 acts as a repository for storing domain level user and workstation memberships, as well as user and workstation caveat memberships. RSecureAttrSvc 122 locates and builds a directory entry object for each caveat found in the appropriate caveat organizational unit ("OU"). In some embodiments, the appropriate caveat OU may be defined at the site and/or LAN level. For each caveat found, the workstation and user are checked to see if both are members of the caveat. If both the workstation and users are members of the caveat, the caveat is a common caveat and is added to the resulting caveat string. Once all caveats are examined, the results are returned to RSecureSvc 110, along with the security level and/or any other required attributes.

Upon completion of the verification process, regardless of pass or fail, RSecureSvc 110 calls RSecureDBSvc 124 to record the results, passing RSecureDBSvc 124 the GUID, the user DN, the workstation DN, the security level, and the common caveats. If authentication failed, additional information may be written to an audit table for auditing purposes.

RSecureDBSvc 124 receives authentication events to be recorded in either an event table 136 or an audit table 138 in database ("RSecureDB") 140. In particular embodiments, the GUID of the original request is used as the key index, and data such as the user, workstation, security level, common caveats, and pass/fail indication are written in event table 136. RSecureDBSvc 124 may also receive queries against the authentication results stored in the "events" table from RSecureSTS 110 and auditing functions. RSecureSTS 110 uses the results to build the security token to be returned to application 106, and auditing functions that will display results to security officers. All of the data associated with an event entry for a requested GUID in event table 136 may be returned to RSecureSTS 110. In particular embodiments, RSecureDBSvc 124 may also have an audit table 138 to which any component of RSecure system 100 may write by calling the audit interface and passing in a data string and an information level, warning, and/or error.

Once RSecureSvc 110 has successfully processed the authentication request, RSecureSTS 108 may issue a security token to workstation 102 to allow workstation 102 to access application 106. In particular embodiments, prior to issuing the security token, RSecureSTS 108 may query RSecureDB 140 to determine whether workstation 102 and its user have been authenticated, for example, by using the GUID to locate the authentication event record corresponding to the authentication request. Based upon the authentication event record, including the common caveats for the workstation and user, RSecureSTS 108 may then issue a security token to workstation 102 to use to access application 106.

In particular embodiments of the present invention, RSecure system 100 may also comprise other services in addition to RSecureSvc 110, RSecureCVSvc 120, RSecureAttrSvc 122, and RSecureDBSvc 124. For example, in particular embodiments, RSecure system 100 may also comprise a session keying service ("RSecureKeySvc") 126. In such an embodiment, RSecureKeySvc 126 may be used by RSecureSvc 110 to provide a session key mechanism for an application that requires one. For example, for a chat application or a VoIP application, each chat room or phone call may be keyed using a unique session key. In particular embodiments, RSecureKeySvc 126 may generate an AES session key using a FIPS 140-2 approved hard token, such as a SPYRUS LYNKS token. The session key may then be encrypted and disseminated securely using RSA techniques.

In particular embodiments, RSecure system 100 may also comprise a content adjudication service ("RSecureAdjSvc") 128. Generally, RSecureAdjSvc 128 may be used to support the adjudication of chat messages, email messages, document content, and/or VoIP content. For example, RSecureAdjSvc 128 may receive a message adjudication request from a chat program containing a caveat string for the chat room, a text string to be adjudicated, a GUID, and a signature by the chat service (if necessary). In particular embodiments, this message adjudication request may be in XML format. RSecureAdjSvc 128 compares the text string in the adjudication request to the caveats for the chat room. For example, if a user is attempting to post a message in a chat room having caveats A and B, then the message may contain any objectionable words contained in the A and/or B objectionable word lists. However, if the text string contains objectionable words for any other caveats defined in the system, the message will be rejected. RSecureAdjSvc 128 may audit the violation in detail. However, in particular embodiments, the error message presented to the user who attempted to post objectionable content may only receive a generic "content violation" message, so as not to divulge the objectionable word the user may not have rights to post. Other suitable services may also be used in accordance with RSecure system 100. With the benefit of this disclosure, one of ordinary skill in the art should be able to identify such services suitable for use with system 100.

In particular embodiments, RSecure system 100 may also include caveats associated with application 106 in the security token prepared for workstation 102 and its user. In such an embodiment, upon the initial request from workstation 102, application 106 may create an application object that is sent back to workstation 102 as part of the message redirecting workstation 102 to RSecureSTS 108. After workstation 102 downloads RSecureXBAP 114, the application object (not illustrated) may be included in the user-to-workstation authentication request generated by RSecureXBAP 114 and sent to RSecureSvc 110. As part of the authentication process, RSecureSvc 110 may retrieve any caveats associated with application 106 so that the caveats may be included along with the user and workstation caveats in any resultant security token. In a particular embodiment, these caveats may also be stored in database 134. RSecureSvc 110 may call RSecureAttrSvc 122 to retrieve them along with the caveats for workstation 102 and its user. RSecureSvc 110 may then determine the common caveats for the user, workstation 102, and application 106, and call RSecureDBSvc 124 to include them in the authentication event record recorded in database 140. RSecureSTS 108 may then utilize the authentication event record when issuing a security token for workstation 102 and its user.

Figure 2:
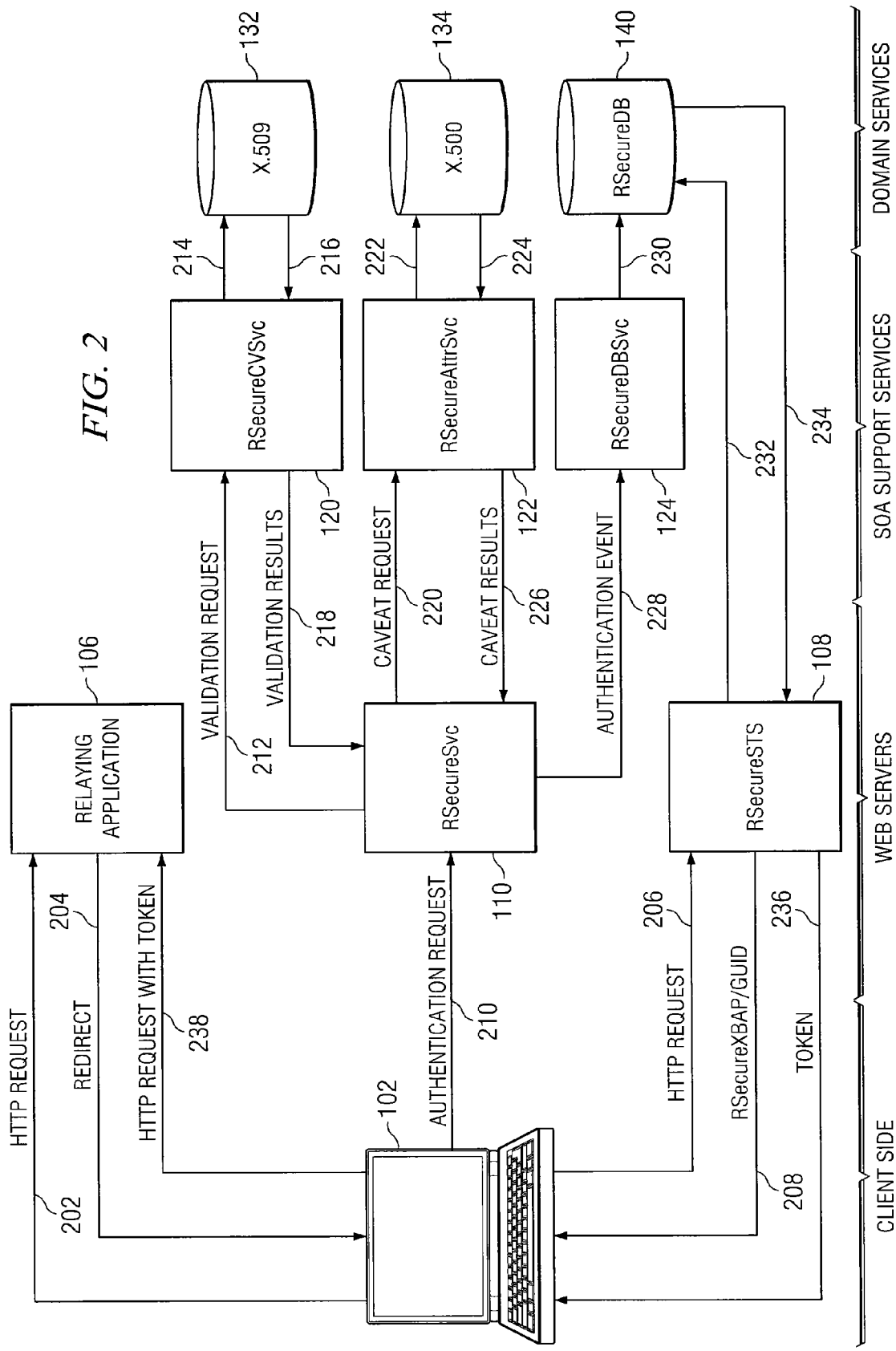
FIG. 2 illustrates the process flow through a system utilizing dynamic, multi-attribute authentication in accordance with a particular embodiment of the present invention.

A better understanding of the authentication process employed by RSecure system 100 may be had by making reference to FIG. 2, which illustrates the process flow through RSecure system 100. This process flow is initiated by workstation 102 when, at step 202, workstation 102 makes an HTTP request to relaying application 106. Since workstation 102 does not present a security token to application 106, application 106 redirects workstation 102 to RSecureSTS 108 at step 204. Accordingly, workstation 102 makes an HTTP request to RSecureSTS 108 at step 206. In response, RSecureSTS 108 generates a GUID for the request and downloads RSecureXBAP 114 to workstation 102 at step 208.

Using RSecureXBAP 114, workstation 102 generates a user-to-workstation authentication request, which is sent to RSecureSvc 110 at step 210. After authenticating the workstation and user, RSecureSvc 110 calls RSecureCVSvc 120 to validate the user and workstation certificates at step 212.

RSecureCVSvc 120 accesses X.509 database 132 at step 214 to validate the workstation and user certificates. The results from this query are then returned to RSecureCVSvc 120 at step 216, and RSecureCVSvc 120, in turn, returns the certificate validation results to RSecureSvc 110 at step 218.

After the workstation and user certificates have been validated by RSecureCVSvc 120, RSecureSvc 110 calls RSecureAttrSvc 122 at step 220 to retrieve the attributes and caveats corresponding to the workstation and user from X.500 or Active Directory database 134. In particular embodiments, this is done using the distinguished names extracted from the workstation and user certificates. Using these distinguished names, RSecureAttrSvc 122 queries database 134 to retrieve the attributes and caveats associated with the workstation and user at step 222. The results of this query are returned to RSecureAttrSvc 122 at step 224. RSecureAttrSvc 122 then determines the caveats common to both the workstation and user, and passes the results to RSecureSvc 110 at step 226.

Having authenticated the workstation and user, validated the workstation and user certificates, and determined the common caveats for the workstation and user, at step 228, RSecureSvc 110 calls RSecureDBSvc 124 to record an authentication event record corresponding to the authentication request. In response, RSecrureDBSvc 124 writes the corresponding authentication event record to RSecureDB 140 at step 230.

Once the authentication event record has been recorded in RSecureDB 140, RSecureSTS 108 queries RSecureDB 140, at step 232, to determine whether the workstation 102 and its user may be allowed to access application 106. The results of the query are returned to RSecureSTS 108 at step 234. If RSecureSvc 110 has approved the authentication request from the workstation, at step 236, RSecureSTS 108 issues a security token to workstation 102, which workstation then uses to access application 106 as step 238.

Figure 3:
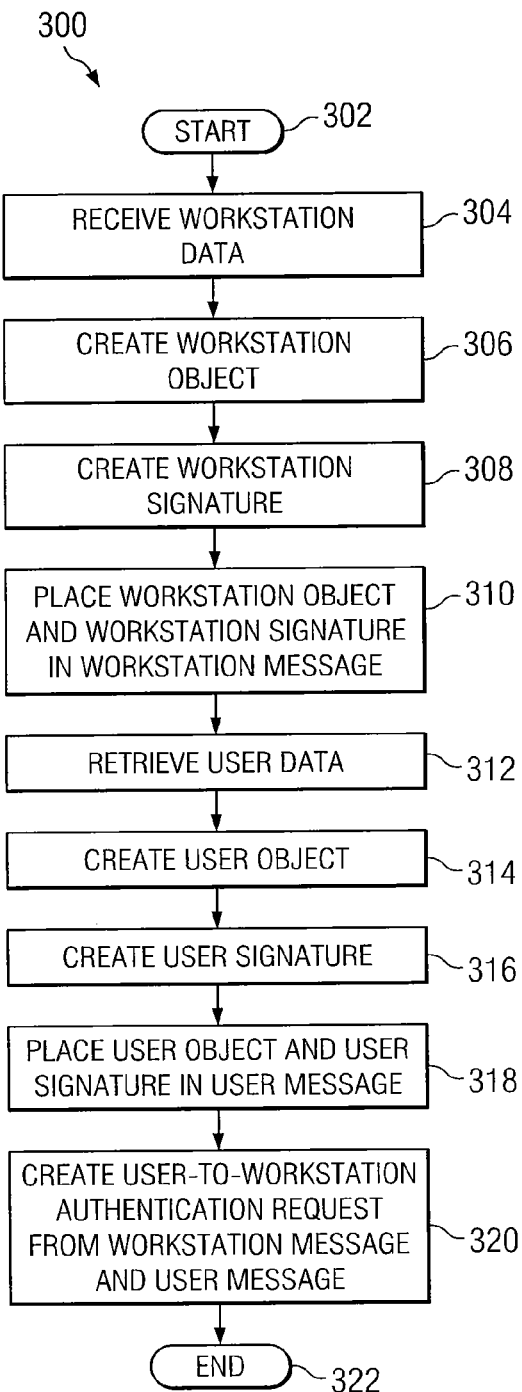
FIG. 3 illustrates a flowchart of a method for creating a dynamic, multi-attribute user-to-workstation authentication request in accordance with a particular embodiment of the present invention.
Figure 4:
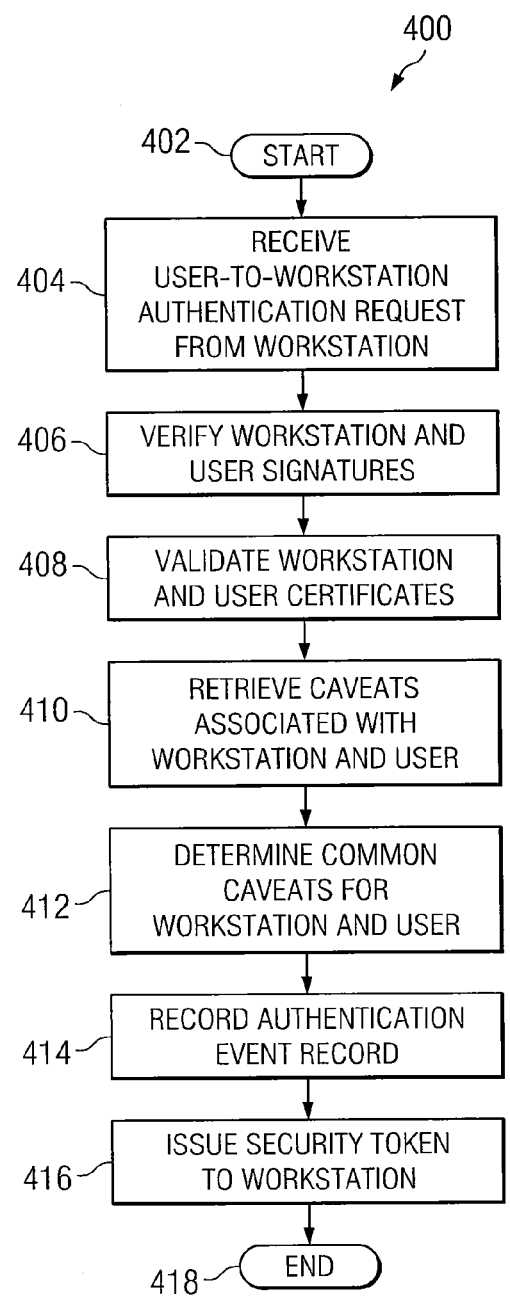
FIG. 4 illustrates a flowchart of a method for processing a multi-attribute user-to-workstation authentication request in accordance with a particular embodiment of the present invention.

With this understanding, FIGS. 3 and 4 illustrate methods of constructing and processing, respectively, a user-to-workstation authentication request in accordance with a particular embodiment of the present invention. As shown in FIG. 3, flowchart 300 illustrates a method of constructing a user-to-workstation authentication request in accordance with a particular embodiment of the present invention. Flowchart 300 starts at step 302. At step 304, workstation data for the authentication request is retrieved. In particular embodiments, this may include a copy of the workstation certificate, the machine name, the domain name, the workstation's IP address, the workstation's ARP table, and/or GPS location information. As discussed previously, the particular types of workstation data retrieved may depend on the capabilities of the device making the authentication request. For example, some devices may not have access to GPS location information. Once the workstation data has been retrieved, the workstation data, along with the GUID and time stamp are serialized into an XML/SOAP message and placed into a workstation object in step 306. The workstation object is then signed in step 308 using the private key of the workstation certificate. The workstation object and workstation signature are placed into a workstation message at step 310.

Once the workstation message has been created, the corresponding user message is then created. At step 312, user data for the authentication request is retrieved. In particular embodiments, this may include the user certificate, user name, user biographical information, and/or user biometric information. Again, in particular embodiments, the type of user information retrieved may depend on the capabilities of the device making the authentication request. For example, some devices may lack the ability to receive biometric information. Once the user information has been retrieved, at step 314 the user data, along with the GUID, time stamp, and a copy of the workstation message created in step 310, are serialized into an XML/SOAP message and placed into a user object. The user object is then signed at step 316 using the private key of the user certificate, and the user object and user signature are placed into a user message at step 318. The user object and workstation object are placed into a user-to-workstation authentication request at step 320, and flowchart 300 ends at step 322.

With the user-to-workstation authentication request created, it may be submitted to a security service, such as RSecureSvc 110 (FIG. 1), for processing. FIG. 4 illustrates flowchart 400, which demonstrates one method for processing a user-to-workstation authentication request in accordance with a particular embodiment of the present invention.

Flowchart 400 begins at step 402. At step 404, a user-to-workstation authentication request is received from a workstation. At step 406, the workstation signature and user signature on the request are verified. In particular embodiments the workstation signature may be verified by extracting the workstation data from the authentication request and reformulating it into a format representative of the original structure of the workstation message, setting the workstation signature value to null and re-serializing the data. The workstation certificate may then be extracted and used to obtain a workstation public key object. This workstation public key object may then be used to verify the workstation signature using the original workstation signature and the newly serialized workstation object.

The user verification may be processed in a similar manner. In particular embodiments, the workstation signature is set to that of the original incoming workstation signature, and the user signature is set to null. The user data is then re-serialized so that the user certificate may be extracted. The user certificate may then be used to obtain a user public key object, which may be used to verify the user signature using the original user signature and the newly serialized user object.

After the workstation and user signatures have been verified, at step 408, the workstation certificate and user certificate are validated. In particular embodiments, this may be done by accessing a corresponding X.509 database and checking the user and workstation certificates for expiration, checking the validity of the issuers against the expected issuers, and/or verifying that the certificates are not present on a certificate revocation list.

After the workstation and user certificates have been validated, at step 410, the caveats associated with the workstation and the user may be retrieved. In particular embodiments, these caveats, along with other user attributes, may be retrieved from an Active Directory or X.500 database. At step 412, these caveats are examined to determine which caveats the workstation and the user have in common.

Once the signatures have been verified, the certificates have been validated, and the common caveats determined, at step 414 an authentication event record corresponding to the authentication request is recorded. In particular embodiments, the GUID for the authentication request may be used as an identifier for the record for that it may be retrieved at a later time, for example, by RSecureSTS 108.

Assuming the authentication request has been approved (i.e., the signatures verified and the certificates validated), at step 416, a security token may be issued to the workstation, based upon the common caveats associated with both the workstation and the user, to allow the workstation to access the requested application. After issuing the security token, flowchart 400 terminates at step 418.

Accordingly, in a particular embodiment of the present invention, an authentication system comprises an authentication web server operable to receive an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The system further comprises a certificate validation module operable to validate the workstation certificate and the user certificate, and an attribute retrieval module operable to retrieve one or more caveats associated the workstation and one or more caveats associated with the user and determine one or more caveats associated with both the workstation and the user.

In another embodiment of the present invention, a method for authentication comprises receiving, at an authentication web server, an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The method further comprises verifying the workstation signature and user signature, validating the workstation certificate and the user certificate, retrieving one or more caveats associated with the workstation and one or more caveats associated with the user, and determining one or more caveats associated with both the workstation and the user.

In yet another embodiment of the present invention, a system for authentication comprises logic encoded in computer-readable media and operable, when executed by one or more processors, to receive an authentication request comprising a workstation message and a user message, wherein the workstation message comprises a workstation object and a workstation signature, the workstation object comprises a workstation certificate associated with a workstation, the user message comprises a user object and a user signature, and the user object comprises a copy of the workstation message and a user certificate associated with a user of the workstation. The logic is further operable to verify the workstation signature and user signature, validate the workstation certificate and the user certificate, retrieve one or more caveats associated with the workstation and one or more caveats associated with the user, and determine one or more caveats associated with both the workstation and the user.

By including a copy of the workstation message in the user object, particular embodiments of the present invention may make the authentication of the user dependent on the authentication of the workstation, helping to reduce workstation signature substitution and/or workstation spoofing. Furthermore, by including additional attributes of the workstation, such as the workstation name and domain name, in the workstation object, and additional attributes of the user, such as the user name and biometric data, in the user object, particular embodiments of the present invention may be able to provide even greater granular control over access to secure data and/or applications.

Although particular embodiments of the method and apparatus of the present invention have been illustrated in the accompanying drawings and described in the foregoing detailed description, it will be understood that the invention is not limited to the embodiments disclosed, but is capable of numerous rearrangements, modifications, and substitutions without departing from the spirit of the invention as set forth and defined by the following claims.

What is claimed is:

1. A user-to-workstation authentication system, comprising:
an authentication web server operable to receive an authentication request from a workstation, the authentication request including a workstation message and a user message, the workstation message including a workstation object and a workstation signature within the workstation message, the workstation object including a workstation certificate associated with a workstation within the workstation object, the user message including a user object and a user signature within the user message, the user object including a copy of the workstation message and a user certificate associated with a user of the workstation within the user object;
a certificate validation module operable to validate each of the workstation certificate and the user certificate; and
an attribute retrieval module operable to retrieve one or more caveats defined for the workstation and one or more caveats defined for the user and determine one or more common caveats defined for both of the workstation and the user, with each of the one or more common caveats being defined for the workstation and being defined for the user;
wherein the user-to-workstation authentication system is operable to provide a success response to the authentication request based on successful authentication of the workstation and successful authentication of the user.

2. The system of claim 1, wherein the workstation object includes one or more items selected from the group consisting of a machine name, a domain name, a time stamp, and a globally unique identifier; and
wherein the user object includes one or more items selected from the group consisting of a user name, biometric data associated with the user, an application name, the machine name, the domain name, the time stamp, and the globally unique identifier.

3. The system of claim 1, wherein the workstation signature is signed using a private key associated with the workstation certificate and the user signature is signed using a private key associated with the user certificate.

4. The system of claim 1, wherein the authentication web server is further operable to verify the workstation signature and the user signature.

5. The system of claim 1, wherein the authentication web server is further operable to:
extract the workstation object and a public key of the workstation certificate from the workstation message;
verify the workstation signature using the workstation Object and the public key of the workstation certificate;
extract the user object and a public key of the user certificate from the user message; and
verify the user signature using the user object and the public key of the user certificate.

6. The system of claim 1, wherein the certificate validation module is operable to validate the workstation certificate and user certificate by performing one or more of the acts selected from group consisting of: checking the workstation and user certificates for expiration, checking the validity of one or more issuers associated with the workstation and user certificates, and verifying that the workstation and user certificates are not present on a certificate revocation list.

7. The system of claim 1, further comprising a database service component operable to record an authentication event associated with the authentication request, the authentication event record including a globally unique identifier, a distinguished name associated with the user, a distinguished name associated with the workstation, and the one or more common caveats defined for both of the workstation and the user.

8. A method for user-to-workstation authentication, comprising;
receiving, at an authentication web server, an authentication request from a workstation, the authentication request including a workstation message and a user message, the workstation message including a workstation object and a workstation signature within the workstation message, the workstation object including a workstation certificate associated with a workstation within the workstation object, the user message including a user object and a user signature within the user message, the user object including a copy of the workstation message and a user certificate associated with a user of the workstation within the user object;
verifying the workstation signature and user signature;
validating each of the workstation certificate and the user certificate;
retrieving one or more caveats defined for the workstation and one or more caveats defined for the user;
determining one or more common caveats defined for both of the workstation and the user, with each of the one or more common caveats being defined for the workstation and being defined for the user; and
providing a success response to the authentication request responsive to successful authentication of the workstation and successful authentication of the user.

9. The method of claim 8, wherein the workstation object includes one or more items selected from the group consisting of a machine name, a domain name, a time stamp, and a globally unique identifier; and
wherein the user object includes one or more items selected from the group consisting of a user name, biometric data associated with the user, an application name, the machine name, the domain name, the time stamp, and the globally unique identifier.

10. The method of claim 8, wherein the workstation signature is signed using a private key associated with the workstation certificate and the user signature is signed using a private key associated with the user certificate.

11. The method of claim 8, wherein verifying the signatures on the first and second components of the authentication request comprises:
extracting the workstation object and a public key of the workstation certificate from the workstation message;
verifying the workstation signature using the workstation object and the public key of the workstation certificate;
extracting the user object and a public key of the user certificate from the user message; and
verifying the user signature using the user object and the public key of the user certificate.

12. The method of claim 8, wherein validating the workstation certificate and the user certificate comprises one or more acts selected from the group consisting of: checking the workstation and user certificates for expiration, checking the validity of one or more issuers associated with the workstation and user certificates, and verifying that the workstation and user certificates are not present on a certificate revocation list.

13. The method of claim 8, further comprising recording an authentication event record associated with the authentication request, the authentication event record including a globally unique identifier, a distinguished name associated with the user, a distinguished name associated with the workstation, and the one or more common caveats defined for both of the workstation and the user.

14. The method of claim 8, further comprising issuing a security token to the workstation based upon the one or more common caveats defined for both of the workstation and the user.

15. Logic encoded in non-transitory computer-readable storage media and operable, when executed by one or more processors, to:
    receive an authentication request from a workstation, the authentication request including a workstation message and a user message, the workstation message including a workstation object and a workstation signature within the workstation message, the workstation object including a workstation certificate associated with a workstation within the workstation object, the user message including a user object and a user signature within the user message, the user object including a copy of the workstation message and a user certificate associated with a user of the workstation within the user object;
    verify the workstation signature and user signature;
    validate each of the workstation certificate and the user certificate;
    retrieve one or more caveats defined for the workstation and one or more caveats defined for the user;
    determine one or more common caveats defined for both of the workstation and the user, with each of the one or more common caveats being defined for the workstation and being defined for the user; and
    provide a success response to the authentication request responsive to successful authentication of the workstation and successful authentication of the user.

16. The logic of claim 15, wherein the workstation object further comprises one or more items selected from the group consisting of a machine name, a domain name, a time stamp, and a globally unique identifier; and
    wherein the user object includes one or more items selected from the group consisting of a user name, biometric data associated with the user, an application name, the machine name, the domain name, the time stamp, and the globally unique identifier.

17. The logic of claim 15, wherein the workstation signature is signed using a private key associated with the workstation certificate and the user signature is signed using a private key associated with the user certificate.

18. The logic of claim 15, wherein verifying the signatures on the first and second components of the authentication request comprises:
    extracting the workstation object and a public key of the workstation certificate from the workstation message;
    verifying the workstation signature using the workstation object and the public key of the workstation certificate,
    extracting the user object and a public key of the user certificate from the user message; and
    verifying the user signature using the user object and the public key of the user certificate.

19. The logic of claim 15, wherein validating the workstation certificate and the user certificate comprises one or more acts selected from the group consisting of: checking the workstation and user certificates for expiration, checking the validity of one or more issuers associated with the workstation and user certificates, and verifying that the workstation and user certificates are not present on a certificate revocation list.

20. The logic of claim 15, further operable to:
    record an authentication event record associated with the authentication request, the authentication event record including a globally unique identifier, a distinguished name associated with the user, a distinguished name associated with the workstation, and the one or more common caveats defined for both of the workstation and the user.

* * * * *

UNITED STATES PATENT AND TRADEMARK OFFICE
CERTIFICATE OF CORRECTION

| | | |
|---|---|---|
| PATENT NO. | : 8,332,647 B2 | Page 1 of 1 |
| APPLICATION NO. | : 12/491558 | |
| DATED | : December 11, 2012 | |
| INVENTOR(S) | : Bradley, II et al. | |

It is certified that error appears in the above-identified patent and that said Letters Patent is hereby corrected as shown below:

In the Specifications

In column 1, line 46, before "the", insert --with--, therefor

In column 3, line 51, delete "100" and insert --110--, therefor

In column 5, line 8, delete "Net-based" and insert --.Net-based--, therefor

In column 5, line 53, delete "assistant), or" and insert --assistant, or--, therefor In column 6, line 63, delete "Net-based" and insert --.Net-based--, therefor In column 7, line 2, delete "Net-based" and insert --.Net-based--, therefor In column 7, line 42, delete "120" and insert --110--, therefor In column 8, line 27, delete "110" and insert --108--, therefor In column 8, line 27, delete "110" and insert --108--, therefor In column 8, line 32, delete "110" and insert --108--, therefor In column 12, line 11, after "associated", insert --with--, therefor In the Claims In column 13, line 50, in claim 5, delete "Object" and insert --object--, therefor Signed and Sealed this
Twenty-second Day of April, 2014

Michelle K. Lee
*Deputy Director of the United States Patent and Trademark Office*